(12) United States Patent
Ephstein et al.

(10) Patent No.: US 8,200,037 B2
(45) Date of Patent: Jun. 12, 2012

(54) IMPORTANCE GUIDED IMAGE TRANSFORMATION (75) Inventors: Boris Ephstein, Bothell, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 983 days.

(21) Appl. No.: 12/020,576

(22) Filed: Jan. 28, 2008

(65) Prior Publication Data

US 2009/0190857 A1 Jul. 30, 2009

(51) Int. Cl.
G06K 9/36 (2006.01)
(52) U.S. Cl. ........................................ 382/276
(58) Field of Classification Search .................. 382/276, 382/293, 298, 254, 275, 100; 701/212
See application file for complete search history.

(56) References Cited

U.S. PATENT DOCUMENTS

| 5,657,073 | A | 8/1997 | Henley |
| 6,016,152 | A | 1/2000 | Dickie |
| 6,563,529 | B1 | 5/2003 | Jongerius |
| 6,681,056 | B1 | 1/2004 | Tseng et al. |
| 6,853,912 | B2 | 2/2005 | Han |
| 6,882,755 | B2 | 4/2005 | Silverstein et al. |
| 6,928,186 | B2 | 8/2005 | Ratnakar |
| 7,548,814 | B2 * | 6/2009 | Pantalone et al. ............. 701/212 |
| 7,809,722 | B2 * | 10/2010 | Gokturk et al. ............... 707/736 |
| 7,953,295 | B2 * | 5/2011 | Vincent et al. ................ 382/299 |
| 2004/0196282 | A1 | 10/2004 | Oh |
| 2006/0139371 | A1 | 6/2006 | Lavine et al. |
| 2006/0247855 | A1 | 11/2006 | de Silva et al. |

FOREIGN PATENT DOCUMENTS

WO 2007004489 A1 1/2007

OTHER PUBLICATIONS

Agarwala, et al., "Interactive Digital Photomontage", To appear in the ACM SIGGRAPH '04 conference proceedings, pp. 1-9.

* cited by examiner

Primary Examiner — Yon Couso (57) ABSTRACT

Importance guided image transformation. A subject image is accessed, an importance is assigned respective features of the subject image and a scaling scheme is determined for the subject image based on the importance assigned the respective features of the subject image. A transformed image is generated based on the determined scaling scheme and the transformed image is provided to an image presentation system for display.

18 Claims, 9 Drawing Sheets

IMPORTANCE GUIDED IMAGE TRANSFORMATION

BACKGROUND

Geo-information systems are systems that are capable of integrating, storing, editing, analyzing, sharing, and displaying geographically referenced information. These systems can be utilized by system users to conveniently obtain information concerning particular geographic locations that are of interest to the users. Some conventional geo-information systems provide users access to street level images whose features have been digitized from photographs of the corresponding street sides.

A number of conventional geo-information systems (Google Earth™, Virtual Earth™) allow a user to browse images of street sides and enable the user to visually explore the location. For example, using a conventional geo-information system, a user can visually explore storefronts and local businesses that are located along the displayed street sides. To accommodate browsing of the images along a street side, the images of consecutive buildings can be stitched together in long panoramas, such as is shown in FIG. 1 which depicts a stitched panorama of a street side such as may be presented by a conventional geo-information system.

Figure 1:
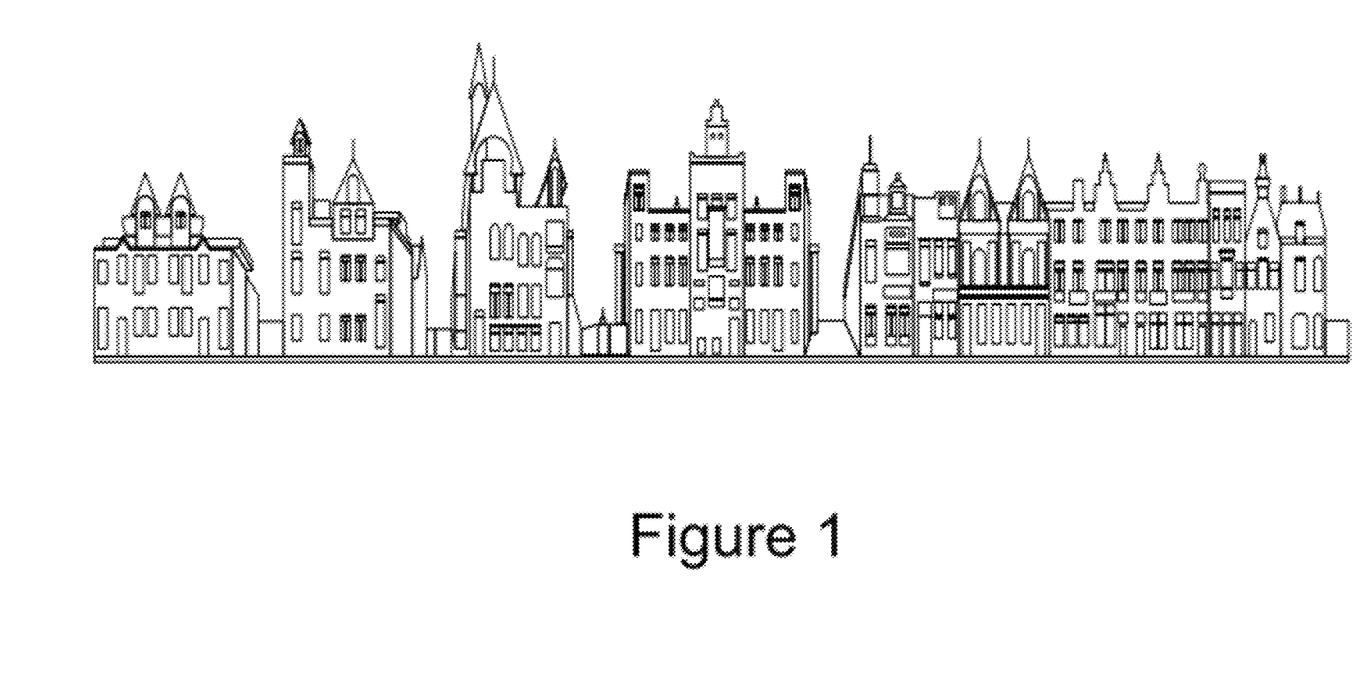
FIG. 1 depicts a stitched panorama of a street side.

Unedited panoramas, like the one that is shown in FIG. 1, are difficult to browse as their resolution can be much higher than the resolution of the conventional display screens upon which they may be presented. Using conventional geo-information systems, in order to browse such a panorama, a user can zoom (e.g., enlarge) the image and scroll a viewing window along the panorama. However, the viewing window may only show a small subpart of the street side, and thus the user may lose the perception of context. In contrast, zooming out (e.g., decreasing the size of the image), may enable the user to view the entire panorama as a narrow image, but can result in a loss of the visibility of fine details of the image's content.

Thus, many conventional geo-information systems cannot perform the basic types of image transformations that are associated with image browsing without surrendering advantageous visual attributes of the originally presented image, such as its context or fine details of its content. Consequently, conventional geo-information systems inadequately perform the basic types of image transformations that are needed to provide users with a truly satisfactory browsing experience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Conventional geo-information systems cannot perform the basic types of image transformations that are associated with image browsing without surrendering advantageous visual attributes of the originally presented image, such as its context or fine details of its content. An Importance guided image transformation (e.g. image scaling) methodology is disclosed that employs non-uniform scaling of subject images (original images to be scaled or transformed) in a manner that emphasizes the preservation of details of the most important features of the subject images. As a part of the disclosed importance guided image transformation methodology, a subject image such as an original image of a street side or map to be scaled is accessed, an importance (e.g., importance score) is assigned to respective features of the subject image such as business signs, windows, etc., and a scaling scheme is determined for the subject image based on the importance that is assigned to its respective features. Thereafter, a transformed image (e.g., scaled version of subject image) is generated based on the determined importance based scaling scheme and the transformed image is provided to an image presentation system (e.g., of desktop, laptop) for display.

BRIEF DESCRIPTION OF THE DRAWINGS

The accompanying drawings, which are incorporated in and form a part of this specification, illustrate embodiments and, together with the description, serve to explain the principles of the embodiments.

The drawings referred to in this description should not be understood as being drawn to scale except if specifically noted.

DETAILED DESCRIPTION

Reference will now be made in detail to various embodiments, examples of which are illustrated in the accompanying drawings. While descriptions will be provided in conjunction with these embodiments, it will be understood that the descriptions are not intended to limit the scope of the embodiments. On the contrary, the disclosure is intended to cover alternatives, modifications and equivalents, of these embodiments. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Figure 2A:
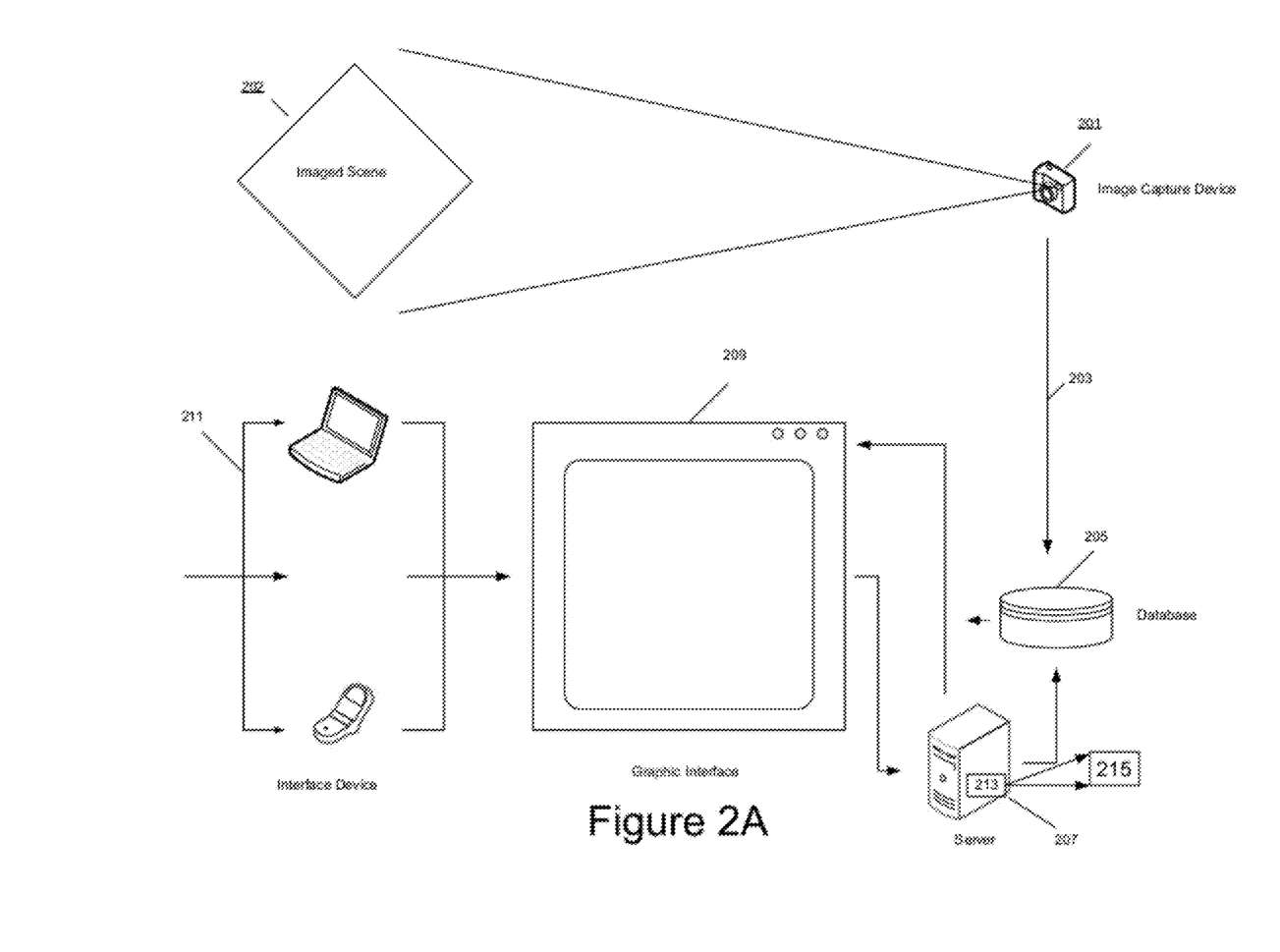
FIG. 2A shows an exemplary operating environment of a system for importance guided image transformation according to one embodiment.

Exemplary Operating Environment of System for Importance Guided Image Transformation FIG. 2A shows an exemplary operating environment of a system 115 for importance guided image transformation according to one embodiment. In one embodiment, system 215 directs non-uniform scaling of subject images (original images to be scaled or transformed) in a manner that emphasizes the preservation of details of the most important features of the subject images in the transformed images. FIG. 2A shows image capture device 201, imaged scene 202, subject image 203, subject image database 205, server 207, graphic interface 209, interface device 211, geo-information system 213 and system 215.

Referring to FIG. 2A, image capture device 201 (e.g., camera, satellite, etc.) captures an image of an imaged scene 202 and generates a subject image 203 (e.g., original image to be transformed or scaled) that can be stored and later requested by and presented to a user of geo-information system 213. In one embodiment, subject image 203 can be stored in image database 205. In one embodiment subject image 203 can include but is not limited to street sides and maps.

Server 207 supports importance guided image transformation services for coupled client devices such as interface device 211 (e.g., desktop computer, laptop computer, cellular phone with internet accessing capability, etc.). In one embodiment, server 207 is supported by subject image database 205 which provides storage for subject images 203 that can be accessed for importance guided image transformation purposes. In one embodiment, server 207 contains geo-information system 213. In one embodiment, a user can access geo-information system 213 via graphic interface 209 which can be presented on interface device 211.

In the FIG. 2A embodiment, geo-information system 213 provides system users the capacity to browse images that can include but are not limited to street sides and maps. In one embodiment, as discussed above, system 213 can reside on server 207. In another embodiment, system 213 can reside on interface device 211. In yet another embodiment, components of system 213 can reside on server 207 and other components of system 213 can reside on interface device 211. In one embodiment, system 213 can be accessed through graphic interface 209 which can be associated with system 213. In one embodiment, using system 213 a user can visually explore a location by browsing street sides inhabited by structures that can include but are not limited to storefronts and local business.

Figure 2B:
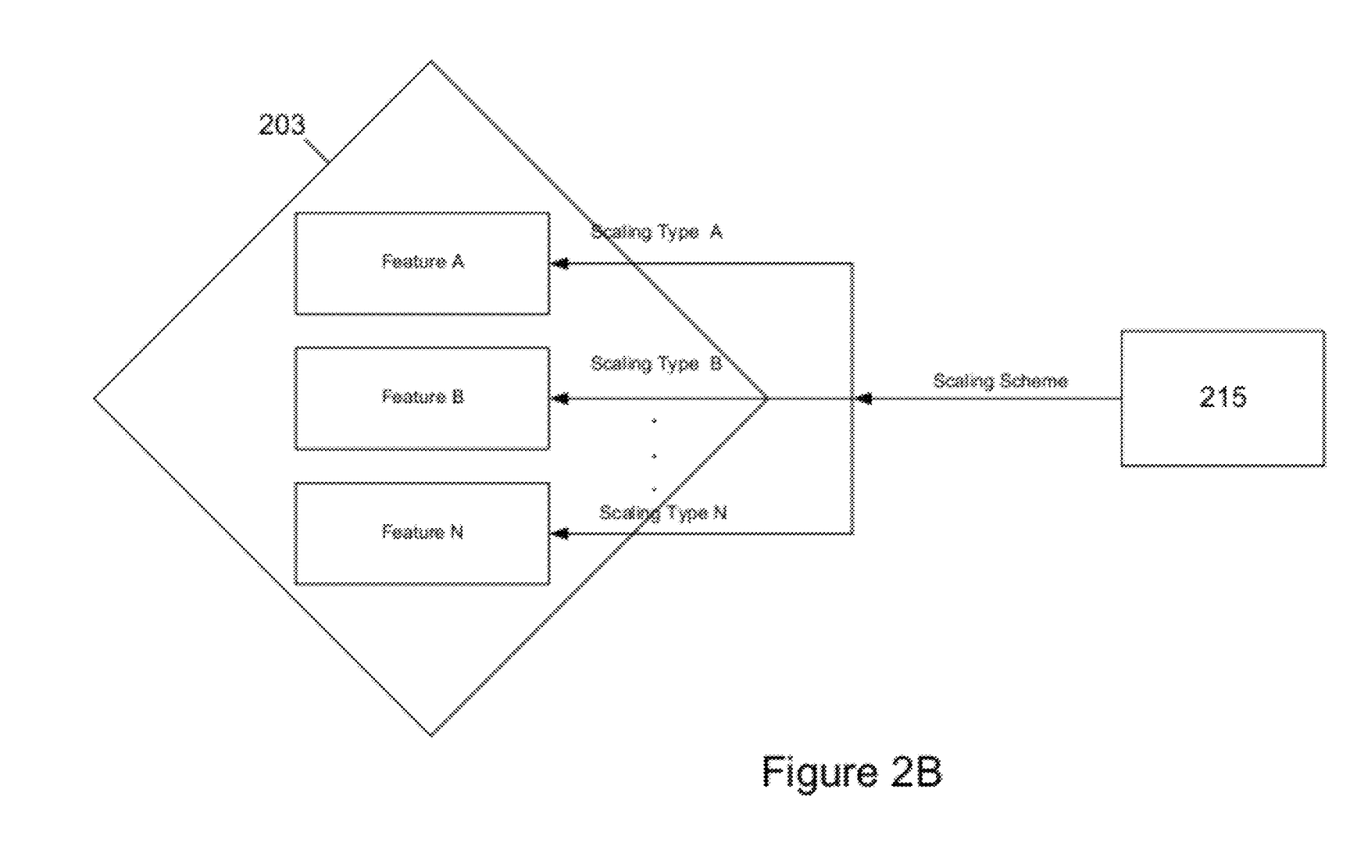
FIG. 2B illustrates that respective scaling types can be utilized for respective portions of a subject image according to one embodiment.

System 215 directs an importance guided scaling (non-uniform or non-linear scaling) of subject image 203 based on an importance score that is assigned to respective features of subject image 203. In one embodiment, system 215 can be an integral part of system 213. In another embodiment, system 215 can be separate from system 213 but operate cooperatively with system 213. In one embodiment, as a part of its operation, system 215 assigns an importance score to respective features of subject image 203, determines an importance guided scaling scheme for subject image 203 based on the assigned importance scores and scales subject image 203 based on the importance guided scaling scheme that has been determined. FIG. 2B illustrates how the importance guided scaling scheme that is devised for subject image 203 can employ the use of different scaling types A-N for respective features A-N of a subject image according to one embodiment.

For example, a scaling scheme for a subject image that includes features A (e.g., a business sign), B (e.g., a set of windows) and N (e.g., an empty space), where A is the most important feature and N is the least important feature, may call for a linear scaling of feature A, the elimination of a set of pixels of feature B and the total elimination of feature N. In this manner an importance guided transformation of subject image 203 that preserves the most important features of subject image 203 is effected. In one embodiment, the transformed image can be made available for presentation to users of system 213.

In one embodiment, system 215 or components thereof can be implemented on either interface device 211 or server 207 (e.g., either client or server sides of a network). In one embodiment, an input to system 213 can include (but is not limited to) a large subject image 203 such as a street side panorama that includes many buildings. In one embodiment, the functioning of system 215 in transforming the image of such a street side panorama can include the following stages: (1) the performance of a semantic analysis of the street side panorama, (2) the identification of pixel sets of the street side panorama that can be eliminated first, second, third, etc., (3) the reduction in size of empty spaces in the street side panorama and (4) the reduction in size of business signs present in the street side panorama.

In one embodiment, in the specific case of a street side panorama the following steps can be performed by system 215 as a part of the aforementioned semantic analysis (1): (a) segmentation of street panorama to single buildings, (b) detection of windows, doors, and other repeating elements such as columns, etc. (c) detection of business signs (plus a possible OCR of the text on the signs) and (d) assignment of a relative importance score (e.g., value) to different features (see the FIGS. 3A and 3B image transformation examples discussed below where business signs are assigned the highest importance).

In one embodiment, separately, for each building of the aforementioned street side panorama, a detection of pixel sets, such as is discussed above, that can be eliminated first, second, third etc. can be identified. In one embodiment, a pixel set selected to be eliminated can consist of a column of pixels (if a horizontal reduction in size of the panorama is desired). By identifying pixel sets to be eliminated based on the importance assigned particular features of a building, pixel sets can be eliminated such that the amount of introduced visual distortion (e.g., a noticeable change in the basic appearance of a feature in the scaled image as compared to the same feature in the original image) of features of the building in the scaled image is minimized and the fidelity of the scaled image to the original is maximized.

For example, in one embodiment, if system 215 directs the removal of a first pixel column that crosses a window of a building that is a part of a subject image, system 215 can correspondingly direct the removal of other pixel columns situated similarly with respect to other windows of the building such that equal sized windows are maintained in the transformed image of the building. It should be appreciated however, that in one embodiment, such image transformation expedients are determined on an application by application basis.

In one embodiment, the reduction of the sizes of empty spaces between buildings can be performed in a manner that is similar to the above discussed reducing of the size of buildings, with fewer precautions (there is less important content in the empty spaces to consider). In addition, in one embodiment, in reducing the size of business signs, if text on a business sign to be reduced is fully recognizable, system 215 can reduce the size of the business sign to produce an easily readable sign that contains the same text by using a smaller font size with higher contrast for readability.

In one embodiment, in addition to the scaling related to street side panoramas discussed above, system 215 can provide importance guided scaling of two-dimensional images. It should be appreciated that in many two-dimensional applications, different parts of the two dimensional image can have unequal importance. Images of maps are examples of two-dimensional images that can be constituted by parts that have unequal importance. The differences in importance of the parts of the maps can be used as the basis for the application of non-uniform importance based scaling, as discussed above, for image transformation purposes.

For example, as a part of an image transformation plan that involves the reduction in the size of a map, as the map is reduced in size, junctions, which may be accorded a high importance, can be retained, while the roads between the junctions, which may be accorded less importance than are junctions, can be shortened. In this manner the important information (e.g., location of landmarks, directions) conveyed by the map is retained although a reduction in the size of the map is achieved. In the same manner relative importance scores can be assigned to urban areas versus rural areas, to areas that have more businesses locations versus areas that have less business locations or areas that yield more search results versus areas that yield less search results, in order to base image transformation.

Operation

Figure 2C:
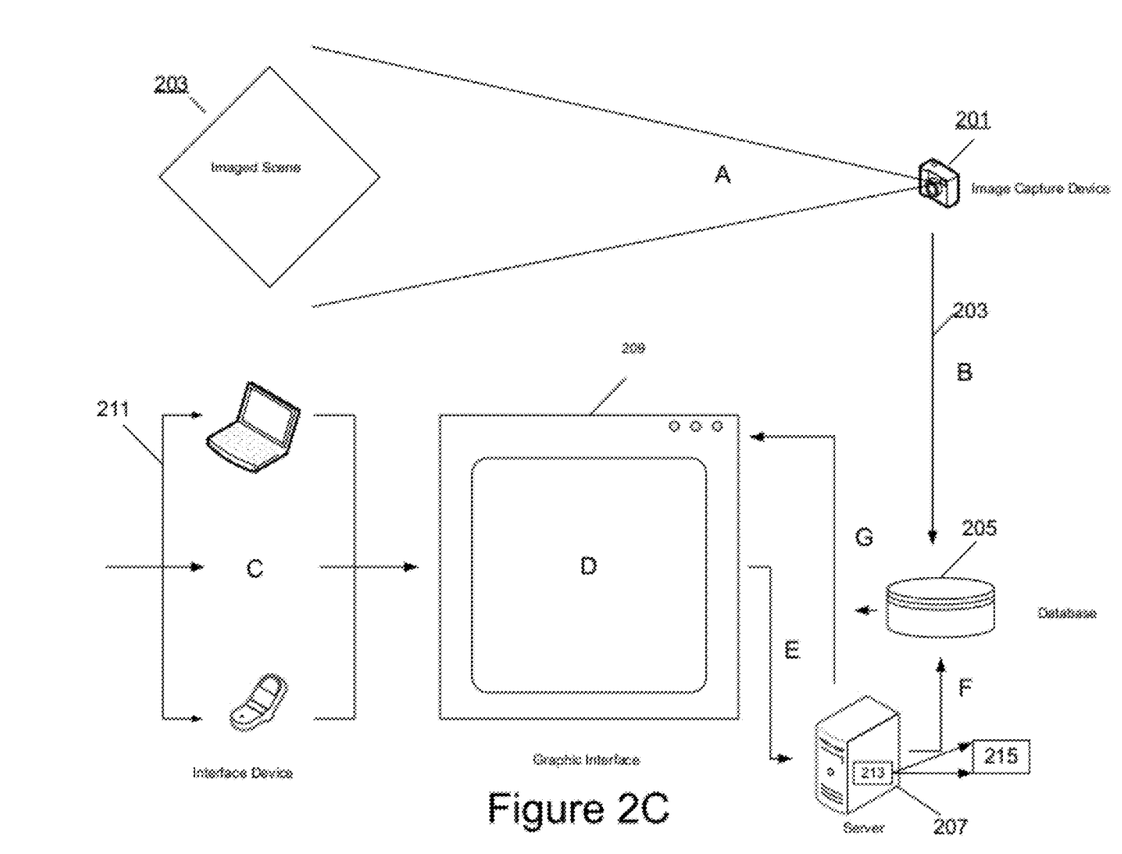
FIG. 2C illustrates operations A-G performed in a process for importance guided image transformation according to one embodiment.

FIG. 2C illustrates operations A-G performed in a process for importance guided image transformation according to one embodiment. These operations including the order in which they are presented are only exemplary. In other embodiments, other operations in other orders can be included.

At A, a subject image is captured such as by image capture device 101. At B, the subject image is stored in database 205. At C, at some later time, a user can make a request via an interface device 211 to access system 213. At D, as a part of the operation of system 213 a graphic interface is presented to the user on a display of interface device 211. At E, via graphic interface 209, a subject image stored in database 205 is accessed. At F, the requested image is retrieved from database 205 and system 215 performs an importance guided image transformation on the subject image that is retrieved such as is described in detail herein with reference to FIG. 2A. At G, after the subject image has been transformed, the transformed image is displayed via graphic interface 209 to the requesting user.

Importance Guided Image Transformation Example

Figure 3A:
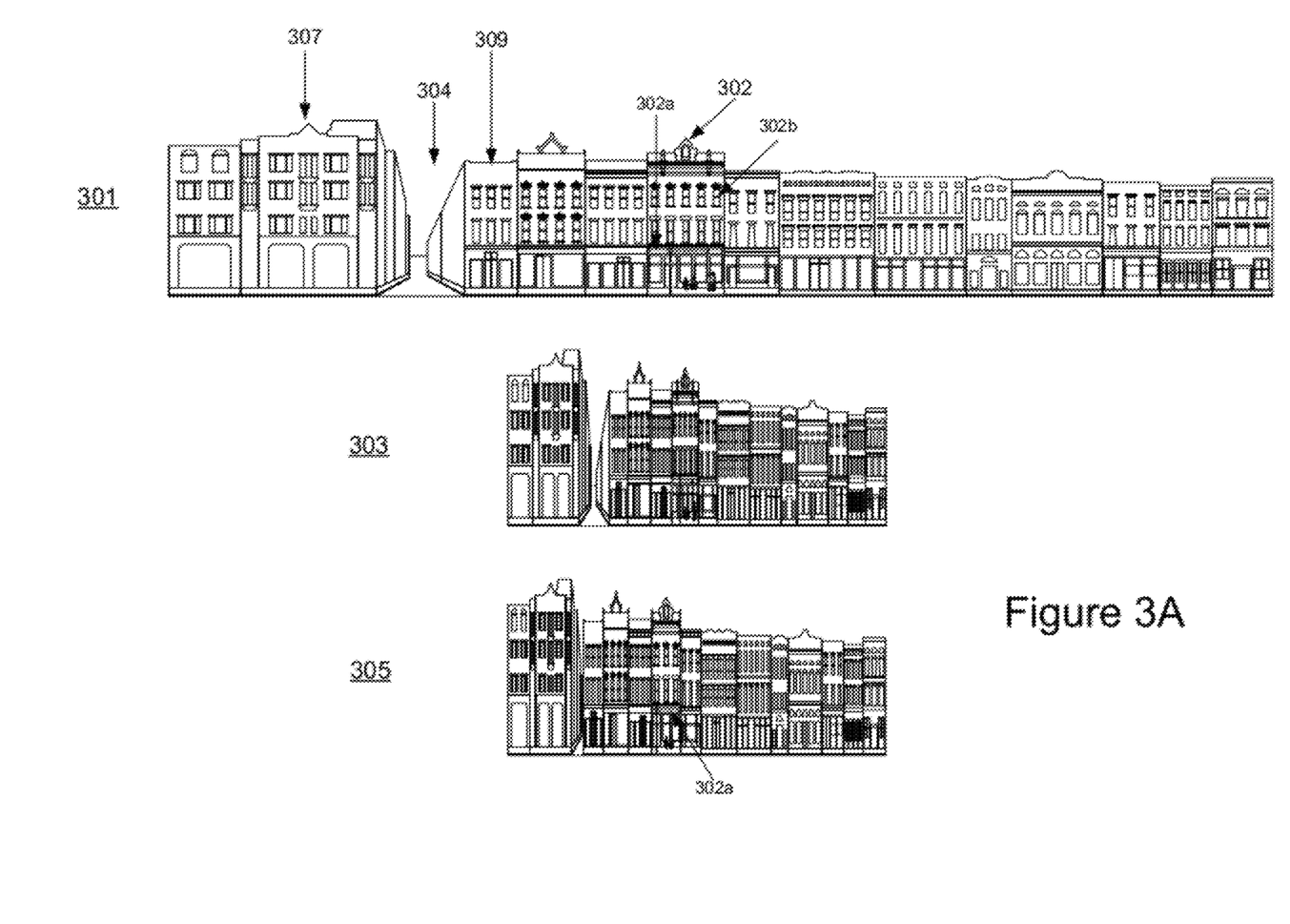
FIG. 3A provides side by side comparisons of the results of importance guided and linear image transformation operations.
Figure 3B:
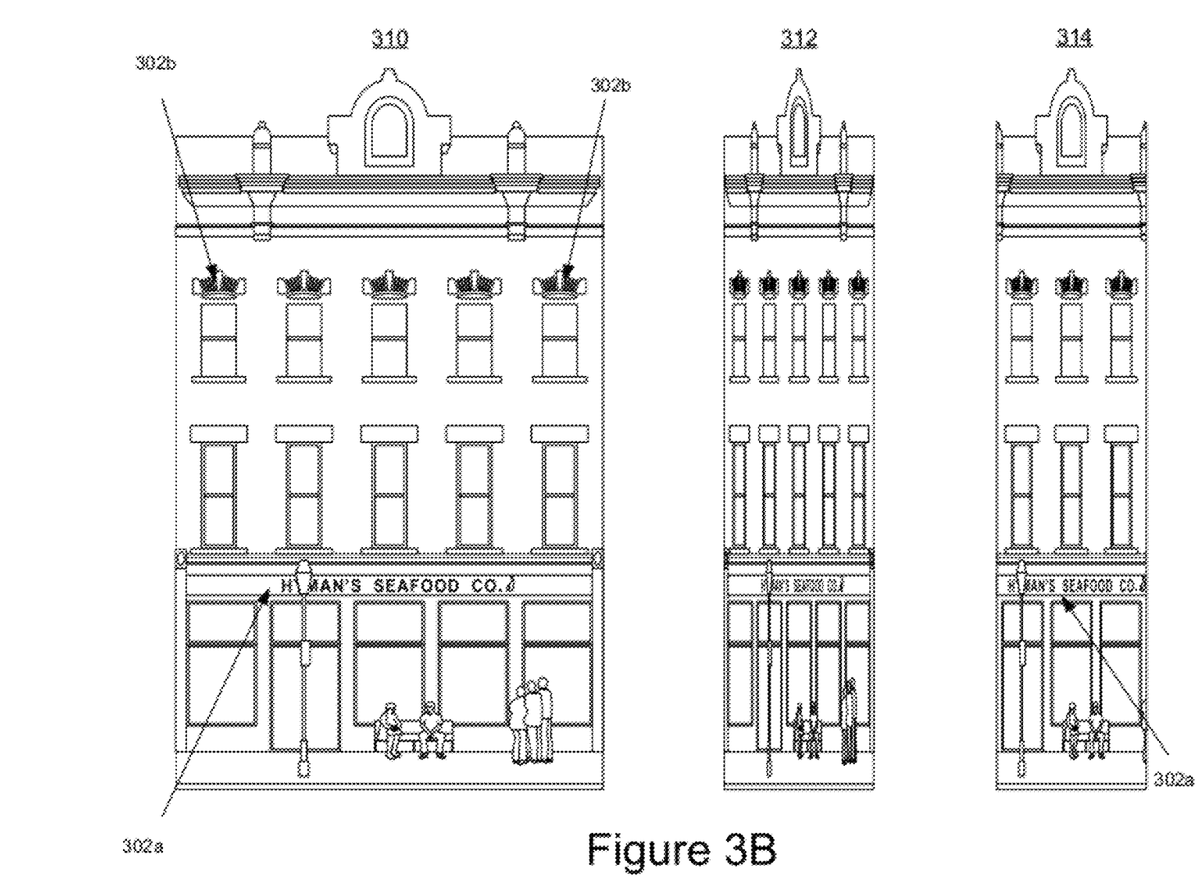
FIG. 3B provides side by side comparisons of the results of importance guided and linear image transformation operations.

FIGS. 3A and 3B provide side by side comparisons of the results of importance guided and linear image transformation methodologies. FIG. 3A shows original street facade 301, linearly scaled street facade 303 and non-uniformly scaled street facade 305. It should be appreciated that original street facade 301 is a subject image (e.g., 203 in FIG. 2A) whose linear and importance guided image transformations respectively result in linearly scaled street facade 303 and non-uniformly scaled street facade 305. Referring to FIG. 3A, linearly scaled street facade 303 is generated through the use of linear scaling (uniform scaling) in the horizontal direction.

It should be appreciated that linearly scaled street facade 303 depicts the same street side image that original street facade 301 does but is scaled to require less screen space than does original street facade 301. However, a shortcoming of the linear scaling methodology that is embodied in linearly scaled street facade 303 is that despite its achievement of a reduction in size of the subject image, a loss of readability of important business sign text (illustrated in FIG. 3B and discussed below) before the image is sufficiently reduced in size (such as to allow review in context within a desired screen space) can result.

Similarly, non-uniformly scaled street facade 305 requires less screen space than does original street facade 301. However, as opposed to linear scaling, the importance based scaling methodology used to generate non-uniformly scaled street facade 305 is devised to reduce the size of original street facade 301 while preserving the readability of business signs such as business sign 302a. This is accomplished by using a first type of scaling to scale the important business sign 302a and a different type of scaling to scale the less important features of original street facade 301 such as outermost windows 302b and space 304 (see discussion made with reference to FIG. 2B). More specifically, business sign 302a is scaled to remain readable while outermost windows 302b and space 304 between building 307 and building 309 are eliminated and reduced respectively.

It should be appreciated that although a different type of scaling may be used to scale less important features of original street facade 301 than is used to scale more important features of original street facade 301 (such as business signs), in one embodiment, the less important features can be scaled in a manner that avoids defacement of features taken from original street facade 301 such that the most important aspects of the basic appearance of original street facade 301 are retained in the non-uniformly scaled street facade 305. In this manner a satisfactorily scaled version of original street facade 301 can be generated without the introduction of visual distortion (e.g., buildings having windows scaled to be differently sized in the scaled image when all windows were the same size in the original image). FIG. 3B illustrates importance guided image transformation using non-uniform scaling in the context of individual building 302.

FIG. 3B shows the original facade 310 of building 302, a linearly scaled facade 312 of building 302 and a non-uniformly scaled facade 314 of building 302. Referring to FIG. 3B, it should be appreciated that the readability of the sign 302a in non-uniformly scaled facade 314 is improved as compared to sign 302a in linearly scaled facade 312. Moreover, it should be appreciated that other features of non-uniformly scaled facade 314 such as the number of windows that it contains are altered yet basic aspects of the arrangement and appearance of the remaining windows as compared to the original facade 307 are maintained such that no visual distortion is introduced.

In one embodiment, non-uniform scaling of street images, such as that shown in FIGS. 3A and 3B can be performed in order to better utilize display screen assets. In one embodiment, this is possible because, as discussed in detail herein, all parts of a street image may not have the same importance for a system user. For example, text signs or shop windows may be important and thus in some cases may simply be brought closer together in an importance guided image transformation, while a brick wall which includes repeating elements may be altered to be based on a sample of the original brick wall in an image transformation as the original brick wall with its repeating elements can be summarized accurately by the sample.

Embodiments improve the experience of browsing street side imagery by nonlinearly transforming images in an importance guided manner where non-informative parts of images are omitted and informative parts of images (such as storefronts and business names) are brought closer together. Moreover, using image analysis, long street side panoramas can be transformed in such a manner that the amount of artifacts (abrupt, artificial changes in image content) and visual distortions can be minimized.

Advantages of embodiments include the capacity to present a user with transformed images of street sides and maps for an improved browsing experience, the use of semantic understandings of parts of building (windows, doors, banners, text) to preserve important information about a building and to minimize the amount of visual distortion that is perceptible in a transformed image of the building (e.g., reducing all windows in a building such that all the windows in a certain building will be scaled equally) and the capacity to alter imagery for better readability (e.g., changing font used in a business sign in a transformed image for better readability).

Figure 4:
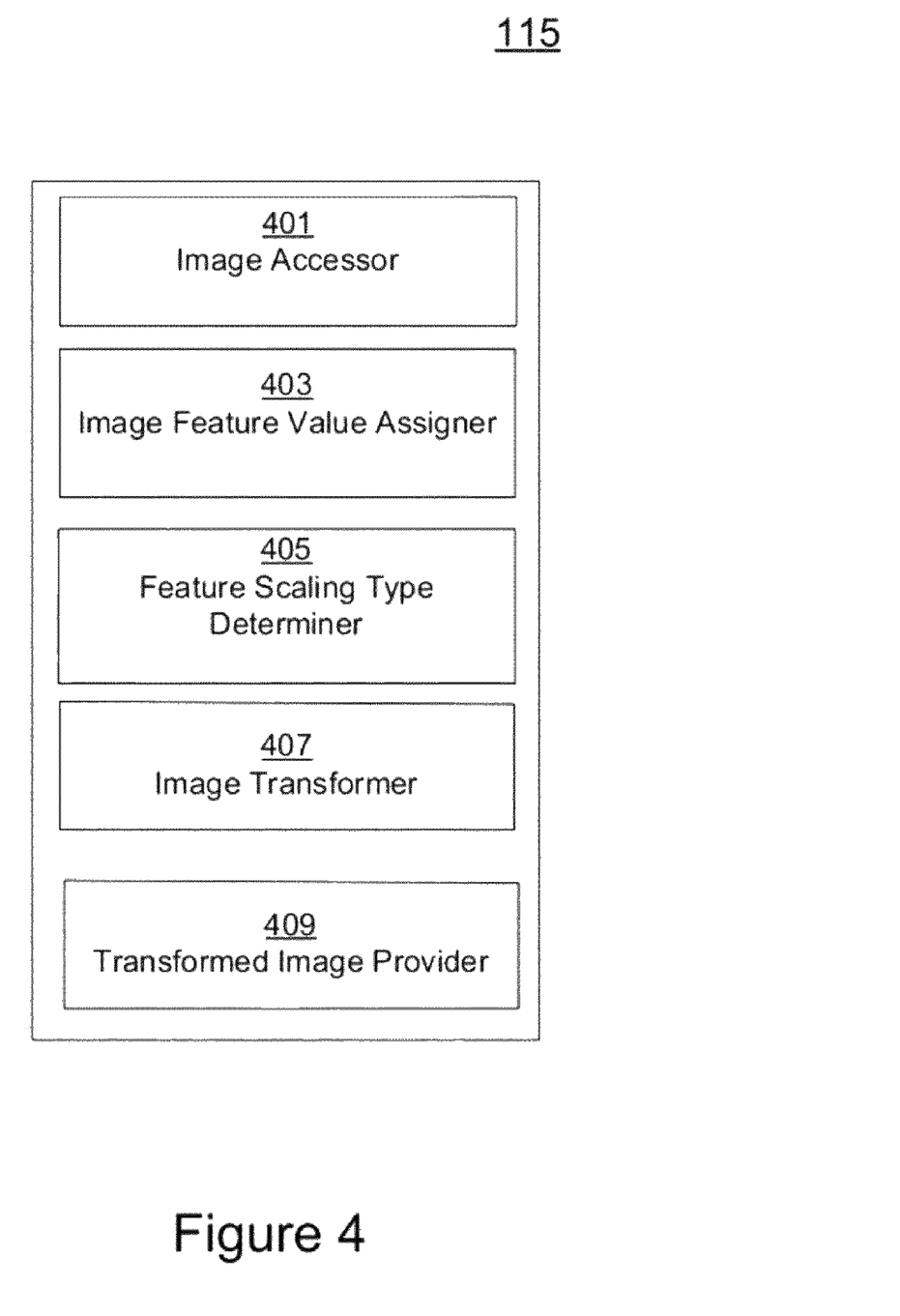
FIG. 4 shows a block diagram of components of a system for importance guided image transformation according to one embodiment.

Components of System for Importance Guided Image Transformation According to Embodiments FIG. 4 shows a block diagram of components of a system 215 for importance guided image transformation according to one embodiment. In one embodiment, system 215 can implement an algorithm for importance guided image transformation. In the FIG. 4 embodiment, system 215 includes image accessor 401, image feature value assigner 403, feature scaling type determiner 405, image transformer 407 and transformed image provider 409.

It should be appreciated that aforementioned components of system 215 can be implemented in hardware or software or in a combination of both. In one embodiment, components and operations of system 215 can be encompassed by components and operations of one or more computer programs (e.g., system 213 in FIG. 2A). In another embodiment, components and operations of system 215 can be separate from the aforementioned one or more computer programs but can operate cooperatively with components and operations thereof.

Referring to FIG. 4, image accessor 401 accesses images that are to be subjected to importance guided image transformation. In one embodiment, image accessor 401 can access images for importance guided image transformation from a database of captured images (e.g., 205 in FIG. 2A).

Image feature value assigner 403 assigns values to respective features of a subject image. It should be appreciated that, the assignment of values to respective features of a subject image is discussed in detail herein with reference to FIGS. 2A and 2B.

Feature scaling type determiner 405 determines the type of scaling that is to be used for respective portions of a subject image. In one embodiment, the scaling type can be based on the importance assigned to constituent features of the subject image (see discussion made herein with reference to FIG. 2B). In one embodiment, determining the type of scaling that is to be used for respective portions of a subject image can comprise determining the different scaling types or expedients to be utilized with respect to respective features of the subject image. It should be appreciated that the respective scaling types together constitute an importance guided image transformation scheme for the subject image. In one embodiment, various scaling expedients employed to scale respective image features can include but are not limited to linear scaling of a feature, elimination of a feature, elimination of a portion of a feature, elimination of a set of pixels (e.g., column, row) from a feature, etc.

Image transformer 407 transforms a subject image into a scaled version of the subject image. In one embodiment, the subject image is transformed into a scaled version of the subject image based on the importance guided scaling scheme determined by scaling plan determiner 405.

Transformed image provider 409 provides the transformed image to a display control system of an associated interface device (e.g., desktop computer, laptop computer, cellular phone with network accessing capability). In one embodiment, the transformed image can be displayed and browsed in a display of an interface device (e.g., 211 in FIG. 2A).

Figure 5:
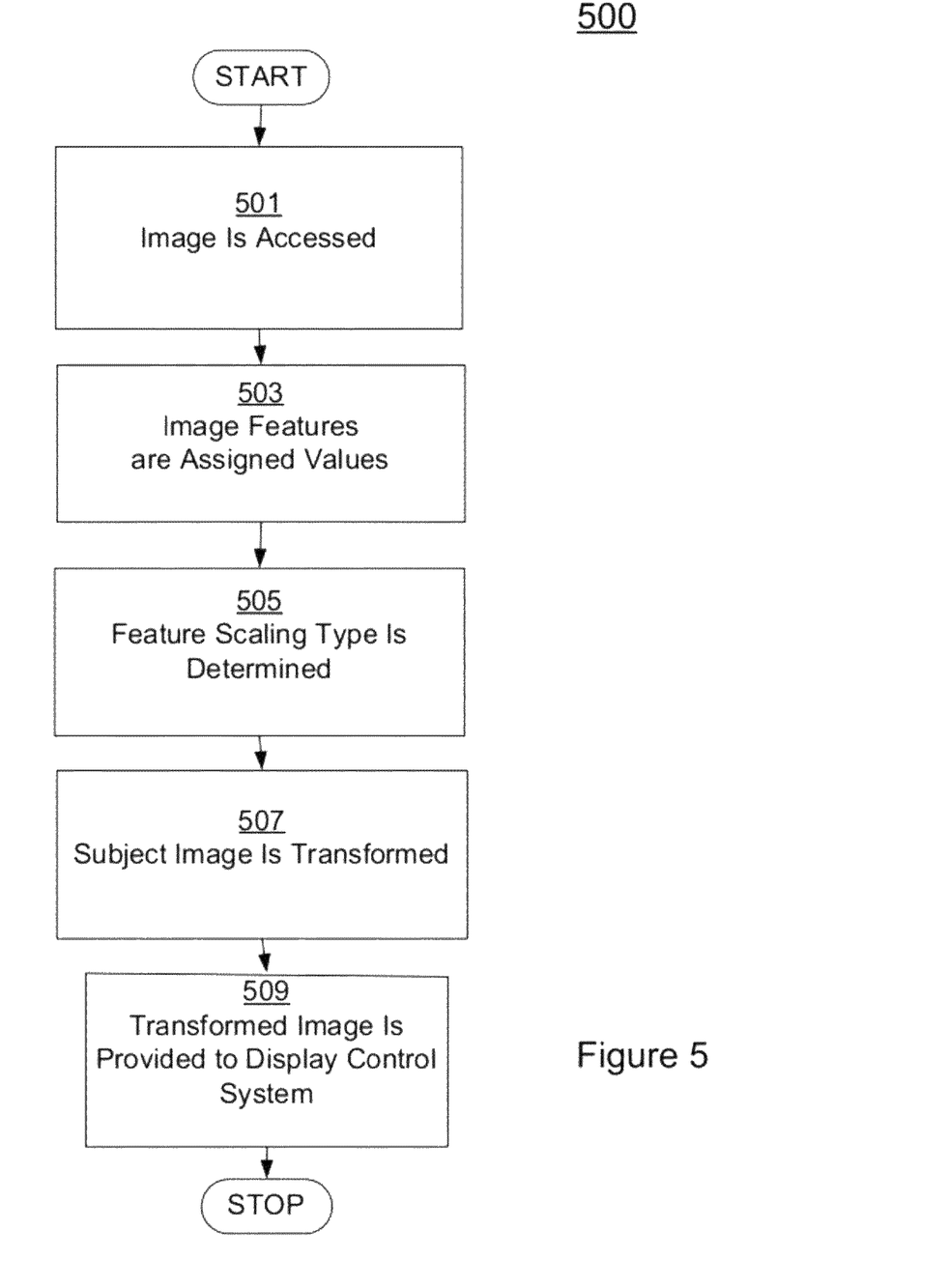
FIG. 5 shows a flowchart of the steps performed in a method for importance guided image transformation according to one embodiment.

Exemplary Operations of System for Importance Guided Image Transformation According to Embodiments FIG. 5 shows a flowchart 500 of the steps performed in a method for importance guide image transformation according to one embodiment. The flowchart includes processes that, in one embodiment, can be carried out by processors and electrical components under the control of computer-readable and computer-executable instructions. Although specific steps are disclosed in the flowcharts, such steps are exemplary. Moreover, embodiments are well suited to performing various other steps or variations of the steps recited in the flowcharts. Within various embodiments, it should be appreciated that the steps of the flowcharts can be performed by software, by hardware or by a combination of both.

Referring to FIG. 5, at step 501 an image is accessed that is to undergo an importance guided image transformation. In one embodiment, the image can be accessed by an image accessor (e.g., 401 in FIG. 4).

At step 503, respective features of a subject image are assigned an importance score. In one embodiment, the importance score assigned respective features of a subject image can be determined by an image feature value assigner (e.g., 403 in FIG. 4).

At step 505, a scaling type for respective portions of the subject image is determined based on the importance assigned respective features of the subject image in step 503. In one embodiment, the scaling type used with respect to respective features of the subject image can be determined by a scaling type determiner (e.g., 405 in FIG. 4). It should be appreciated that the respective scaling types together constitute an importance guided image transformation scheme for the subject image.

At step 507, the subject image is transformed. In one embodiment, the subject image is transformed by an image transformer (e.g., 407 in FIG. 4) using the importance guided image transformation scaling scheme determined at step 505.

At step 509, the transformed image is provided to a display control system of an interface device. In one embodiment, the transformed image can be provided to a display control system by a transformed image provider (e.g., 409 in FIG. 4).

Exemplary Hardware and Operating Environment According to One Embodiment

Figure 6:
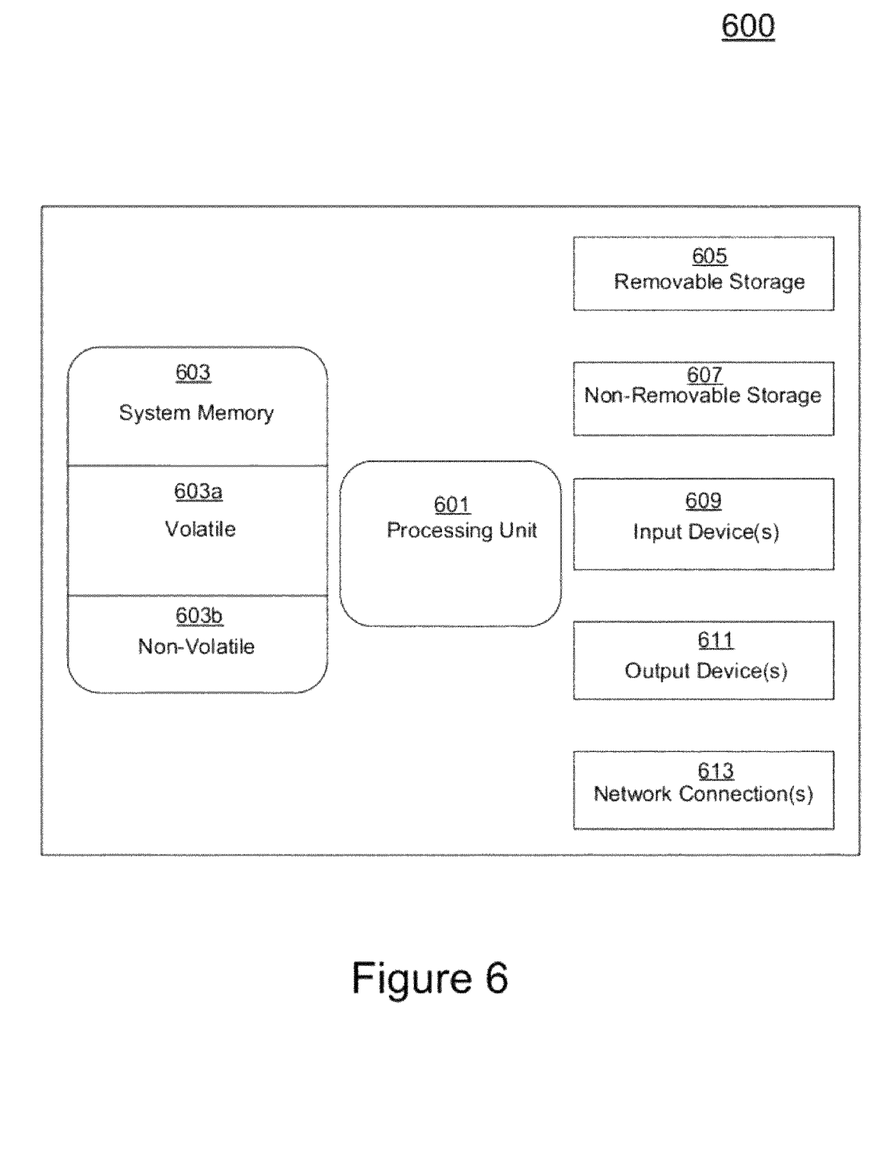
FIG. 6 shows an exemplary computing device according to one embodiment.

FIG. 6 shows an exemplary computing device 600 according to one embodiment. Referring to FIG. 6, computing device 600 can be included as a part of a server (e.g., server 207 in FIG. 2A) and/or an interface device (interface device 211 in FIG. 2A) in accordance with one embodiment. Computing device 600 typically includes at least some form of computer readable media. Computer readable media can be any available media that can be accessed by computing device 600 and can include but is not limited to computer storage media.

In its most basic configuration, computing device 600 typically includes processing unit 601 and memory 603. Depending on the exact configuration and type of computing device 600 that is used, memory 603 can be volatile (such as RAM) 603a, non-volatile 603b (such as ROM, flash memory, etc.) or some combination of the two.

Additionally, computing device 600, especially the version that can be a part of server 207 in FIG. 2A, can include mass storage systems (removable 605 and/or non-removable 607) such as magnetic or optical disks or tape. Similarly, computing device 600 can include input devices 609 and/or output devices 611 (e.g., such as a display). Additionally, computing device 600 can include network connections 613 to other devices, computers, networks, servers, etc. using either wired or wireless media. As all of these devices are well known in the art, they need not be discussed in detail.

With reference to exemplary embodiments thereof, importance guided image transformation is disclosed. A method includes accessing a subject image, assigning an importance to respective features of the subject image, determining a scaling scheme for the subject image based on the importance that is assigned to the respective features of the subject image and generating a transformed image based on the scaling scheme. The transformed image is provided to an image presentation system for display.

The foregoing descriptions of specific embodiments have been presented for purposes of illustration and description. They are not intended to be exhaustive or to limit the subject matter to the precise forms disclosed, and obviously many modifications and variations are possible in light of the above teaching. The embodiments were chosen and described in order to best explain the principles of the disclosed subject matter and its practical application, to thereby enable others skilled in the art to best utilize the disclosed subject matter and various embodiments with various modifications as are suited to the particular use contemplated. It is intended that the scope of the disclosed subject matter be defined by the Claims appended hereto and their equivalents.

What is claimed is:

1. A processor implemented method for importance guided image transformation, comprising:
   determining a non-uniform scaling scheme for a subject image based on the importance that is accorded respective features of said subject image;
   generating a transformed image based on said non-uniform scaling scheme wherein said respective features are transformed based on respective different scaling types; and
   using a processor, providing access to said transformed image to an image presentation system for display,
   wherein said importance that is accorded respective features of said subject image is determined by:
   segmenting said subject image according to individual buildings;
   detecting repeating elements of said individual buildings;
   detecting business signs in said individual buildings; and
   assigning relative scores to respective features of said individual buildings.

2. The method of claim 1 wherein said subject image is selected from the group consisting of street sides and maps.

3. The method of claim 1 wherein said importance guided image transformation comprises preserving important information from said subject image and minimizing visual distortion in said transformed image.

4. The method of claim 1 wherein said generating a transformed image based on said non-uniform scaling scheme comprises changing a font of a business sign.

5. The method of claim 1 wherein said generating said transformed image comprises detecting pixel sets of said subject image that are to be eliminated.

6. The method of claim 1 wherein said generating said transformed image comprises reducing the size of empty spaces between buildings that are captured in said subject image.

7. The method of claim 1 wherein said generating said transformed image comprises reducing the size of business signs of buildings that are captured in said subject image.

8. A processor implemented method for geo-information system importance guided image transformation, comprising:
   accessing a subject image;
   placing a value on respective portions of said subject image;
   using a processor, determining a non-uniform scaling scheme for said subject image based on said value that is placed on said respective portions of said subject image wherein said non-uniform scaling scheme comprises respective different scaling types for said respective portions of said subject image;
   generating a transformed image based on said non-uniform scaling scheme; and
   providing said transformed image to an image presentation system of said geo-information system for display,
   wherein said placing a value on respective portions of said subject image comprises:
   segmenting said subject image according to individual buildings;
   detecting repeating elements of said individual buildings;
   detecting business signs in said individual buildings; and
   assigning relative scores to respective features of said individual buildings.

9. The method of claim 8 wherein said subject image is selected from the group consisting of street sides and maps.

10. The method of claim 8 wherein said importance guided image transformation comprises preserving important information from said subject image and minimizing visual distortion in said transformed image.

11. The method of claim 8 wherein said generating a transformed image based on non-uniform said scaling scheme comprises changing a font of a business sign.

12. The method of claim 8 wherein said generating said transformed image comprises detecting pixel sets of said subject image that are to be eliminated.

13. The method of claim 8 wherein said generating said transformed image comprises reducing the size of empty spaces between buildings that are captured in said subject image.

14. The method of claim 8 wherein said generating said transformed image comprises reducing the size of business signs of buildings that are captured in said subject image.

15. A computer-readable medium having computer-executable instructions for performing steps, comprising:
   accessing a subject image;
   placing a value on respective portions of said subject image;
   determining a non-uniform scaling scheme for said subject image based on said value that is placed on said respective portions of said subject image wherein said non-uniform scaling scheme comprises respective different scaling schemes for said respective portions of said subject image;
   generating a transformed image based on said non-uniform scaling scheme; and
   providing said transformed image to an image presentation system for display,
   wherein said placing a value on respective portions of said subject image comprises:
   segmenting said subject image according to individual buildings;
   detecting repeating elements of said individual buildings;
   detecting business signs in said individual buildings; and
   assigning relative scores to respective features of said individual buildings.

16. The medium of claim 15 wherein said subject image is selected from the group consisting of street sides and maps.

17. The medium of claim 15 wherein said importance guided image transformation comprises preserving important information from said subject image and minimizing visual distortion in said transformed image.

18. The medium of claim 15 wherein said generating a transformed image based on said non-uniform scaling scheme comprises changing a font of a business sign.

* * * * *

UNITED STATES PATENT AND TRADEMARK OFFICE
CERTIFICATE OF CORRECTION

PATENT NO.       : 8,200,037 B2                                   Page 1 of 1
APPLICATION NO.  : 12/020576
DATED            : June 12, 2012
INVENTOR(S)      : Epshtein et al.

It is certified that error appears in the above-identified patent and that said Letters Patent is hereby corrected as shown below:

In Title page, in field (75), under "Inventors" column 1, line 1, delete "Boris Ephstein," and insert -- Boris Epshtein, --, therefor.

Signed and Sealed this
Sixteenth Day of October, 2012

David J. Kappos
*Director of the United States Patent and Trademark Office*